(12) United States Patent
Sato

(10) Patent No.: US 7,586,043 B2
(45) Date of Patent: Sep. 8, 2009

(54) NON-HALOGENOUS INSULATED WIRE AND A WIRING HARNESS

(75) Inventor: Masashi Sato, Yokkaichi (JP)

(73) Assignees: Autonetworks Technologies, Ltd., Mie (JP); Sumitomo Wiring Systems, Ltd., Mie (JP); Sumitomo Electric Industries, Ltd., Osaka (JP)

( * ) Notice: Subject to any disclaimer, the term of this patent is extended or adjusted under 35 U.S.C. 154(b) by 168 days.

(21) Appl. No.: 11/918,605

(22) PCT Filed: Apr. 28, 2006

(86) PCT No.: PCT/JP2006/308997

§ 371 (c)(1),
(2), (4) Date: Oct. 29, 2007

(87) PCT Pub. No.: WO2006/118254

PCT Pub. Date: Nov. 9, 2006

(65) Prior Publication Data

US 2009/0057009 A1  Mar. 5, 2009

(30) Foreign Application Priority Data

Apr. 28, 2005  (JP) .............................. 2005-131341

(51) Int. Cl.
*H01B 7/00* (2006.01)
(52) U.S. Cl. ................. 174/110 R; 174/110 PM; 174/120 R; 174/120 SR
(58) Field of Classification Search ............ 174/110 R, 174/110 AR, 110 SR, 110 PM, 120 R, 120 AR, 174/120 SR
See application file for complete search history.

(56) References Cited

U.S. PATENT DOCUMENTS 5,418,272 A  5/1995  Kawabata et al.

2002/0001715 A1  1/2002  Redondo et al.
2006/0194909 A1*  8/2006  Inoue et al. ................. 524/430
2007/0048524 A1*  3/2007  Hase .......................... 428/375
2007/0155883 A1*  7/2007  Sato et al. ................... 524/420

FOREIGN PATENT DOCUMENTS

| EP | 1 102 282 A1 | 5/2001 |
|---|---|---|
| JP | A-03-254016 | 11/1991 |
| JP | A-04-189855 | 7/1992 |
| JP | A-06-290638 | 10/1994 |
| JP | A-09-095570 | 4/1997 |
| JP | A-11-219626 | 8/1999 |
| JP | A-2001-155554 | 6/2001 |
| JP | A-2001-206993 | 7/2001 |
| JP | A-2001-250432 | 9/2001 |
| JP | A-2001-302851 | 10/2001 |
| JP | B2-3280105 | 2/2002 |
| JP | A-2002-526885 | 8/2002 |
| JP | A-2003-157725 | 5/2003 |
| WO | WO 00/19452 A1 | 4/2000 |

* cited by examiner

*Primary Examiner*—William H Mayo, III
(74) *Attorney, Agent, or Firm*—Oliff & Berridge, PLC

(57) ABSTRACT

A non-halogenous insulated wire, which includes a conductor, an inside coat formed of one or more layers and an outermost coat, wherein the outermost coat is in the range of I0-I00 μm in thickness and made from a resin composition including one or more sorts of polyethylene such that an average density of the included polyethylene becomes 0.910 g/cm³ or more, and at least one of the layers is made from a resin composition including a resin ingredient which includes (A) polyethylene and (B) at least one sort of polymer, (C) a metallic hydrate, and (D) a zinc compound, in which at least one of (B) the polymer is modified by acid and/or (E) an organic functional coupling agent is further included.

8 Claims, No Drawings

NON-HALOGENOUS INSULATED WIRE AND A WIRING HARNESS

TECHNICAL FIELD

The present invention relates to a non-halogenous insulated wire and a wiring harness, and more specifically relates to a non-halogenous insulated wire having a multilayered structure and a wiring harness including the same.

BACKGROUND ART

Conventionally, for a covering material for insulated wires used in carrying out wiring of parts for a car and electric/electronic equipment, a vinyl chloride resin composition to which a halogenous flame retardant is added is in widespread use.

However, there is a problem that this type of vinyl chloride resin composition includes halogen elements, so that it emits harmful halogenous gas into the atmosphere in case of car fire or at the time of combustion for disposing of electric/electronic equipment by incineration, causing environmental pollution.

Therefore, from the view point of reducing loads on the global environment, the vinyl chloride resin composition has been recently replaced with a so-called non-halogenous flame-retardant resin composition, which is prepared by adding a metallic hydrate such as magnesium hydroxide as a non-halogenous flame retardant to an olefin resin such as polyethylene.

However, the olefin resin is essentially combustible, and the non-halogenous flame retardant is inferior to a halogenous flame retardant in effect of flame retardancy. For these reasons, the non-halogenous flame-retardant resin composition requires a large amount of metallic hydrate to be added thereto in order to secure sufficient flame retardancy, thus bringing a disadvantage that mechanical properties such as wear resistance, tensile elongation and tensile strength remarkably degrade.

In order to overcome such a disadvantage, Japanese Patent Gazette No. 3280105, for example, discloses a flame-retardant resin composition which is prepared by adding a metallic hydrate and a cross-linking auxiliary agent to resin ingredients containing polyethylene or an alpha-olefin copolymer and an ethylene copolymer or a rubber, and by making the resin ingredient further contain a specific functional group.

DISCLOSURE OF THE INVENTION

Problems to be Solved by the Invention

However, an insulated wire in which the conventional flame-retardant resin composition is used as a covering material has a problem as described below.

That is, as described in Japanese Patent Gazette No. 3280105, an attempt to mitigate a negative effect caused by filling the resin composition with a large amount of flame retardant has been recently made by variously improving the resin ingredients in the resin composition, however, the mechanical properties such as wear resistance are not sufficiently acquired yet, which need to be further improved.

In addition, there is another problem as described below which needs to be taken into consideration together with the above problem.

Generally, in the case of using the insulated wire in a car such as an automobile, it is often the case that a plurality of insulated wires are tied into a wire bundle, around which a protective material in various shapes such as a tape, tube and sheet is wound so as to be used as a wiring harness.

The insulated wires making up the wiring harness have been replaced with non-halogenous insulated wires in which the non-halogenous flame-retardant resin composition is used as a covering material, but also vinyl chloride insulated wires in which a vinyl chloride resin composition such as polyvinyl chloride is used as a covering material are still used based on track records.

Therefore, the situation is such that mixed use of the non-halogenous insulated wires and the vinyl chloride insulated wires is difficult to completely avoid. However, use of the non-halogenous insulated wires in contact with the vinyl chloride insulated wires has a problem of remarkably deteriorating the covering material for the non-halogenous insulated wires in the wire bundle and degrading its long-term heat resistance (i.e., a problem in coordination with other materials).

Even if the insulated wires making up the wiring harness are completely replaced with the non-halogenous insulated wires in the future, a halogenous flame-retardant resin composition such as a vinyl chloride resin composition is often used for a base material of the wiring-harness protective material to be wound around the wire bundle, and use of the non-halogenous insulated wires in contact with the halogen-containing protective material also has a problem in coordination with other materials as described above.

The causes of the problems are not found in a detailed mechanism. However, the problems are assumably caused because when the non-halogenous insulated wires are made in contact with the vinyl chloride insulated wires or the halogen-containing protective material, an antioxidant in the covering material made from the non-halogenous flame-retardant resin composition is remarkably consumed, or the antioxidant itself makes a transition into the vinyl chloride insulated wires or the protective material. At any rate, there is also a need to immediately solve these problems of deterioration.

An object of the present invention is to overcome the problems described above and to provide a non-halogenous insulated wire which possesses sufficient flame retardancy, excellent mechanical properties such as wear resistance, excellent flexibility, excellent workability, and excellent coordination with other materials, especially with a halogen-containing resin material.

Another object of the present invention is to provide a wiring harness including the non-halogenous insulated wire.

Means to Solve the Problem

To achieve the objects and in accordance with the purpose of the present invention, a non-halogenous insulated wire according to a preferred embodiment of the present invention includes a conductor, an inside coat formed of one or more layers and arranged to cover the conductor, and an outermost coat arranged to cover the inside coat, wherein the outermost coat is in the range of 10 to 100 µm in thickness and is made from a resin composition including one or more sorts of polyethylene such that an average density of the included polyethylene becomes 0.910 g/cm$^3$ or more, and at least one of the layers of the inside coat is made from a resin composition including a resin ingredient by 100 part weight which includes (A) polyethylene having a melt flow rate (MFR) of 5 g/10 min or less and having a density of 0.90 g/cm$^3$ or more and (B) at least one sort of polymer selected from (B1) an alpha-olefin polymer (copolymer) (B2) an ethylene-vinylester copolymer, (B3) an ethylene-alpha, beta-unsaturated carboxylic acid alkyl ester copolymer, and (B4) a styrene thermoplastic elastomer, (C) a metallic hydrate by 30 to 250 part weight, and (D) a zinc compound by 1 to 20 part weight, in which a weight percentage of (A) the polyethylene is 30 to 90 wt % and a weight percentage of (B) the polymer is 70 to 10 wt %, and at least one of (B) the polymer is modified by acid and/or (E) an organic functional coupling agent is further included by 0.3 to 10 part weight.

In this case, it is preferable that (D) the zinc compound is zinc sulfide.

In addition, it is preferable that the outermost coat and/or the inside coat is cross-linked.

Meanwhile, a wiring harness according to the present invention includes the non-halogenous insulated wire.

EFFECTS OF THE INVENTION

The non-halogenous insulated wire according to the present invention has a multilayered structure, in which the outermost coat is made from the specified resin composition which is not filled with a large amount of flame retardant such as a metallic hydrate. By the inclusion of the outermost coat, the non-halogenous insulated wire is excellent especially in mechanical properties such as wear resistance compared with a conventional insulated wire which is covered with one layer of a flame-retardant resin composition containing a large amount of flame retardant such as a metallic hydrate.

Besides, the non-halogenous insulated wire according to the present invention includes the inside coat which is formed of one or more layers inside the outermost coat, in which at least one of the layers is made from the specified resin composition.

Accordingly, by the inclusion of the inside coat, the non-halogenous insulated wire maintains sufficient flame retardancy, mechanical properties such as wear resistance, flexibility and workability while possessing excellent coordination with other materials, especially with a halogen-containing resin material.

When (D) the zinc compound is zinc sulfide, the non-halogenous insulated wire becomes more excellent in the effects described above. In addition, when the outermost coat and/or the inside coat is cross-linked, the non-halogenous insulated wire becomes excellent in the effects described above, and also in heat resistance.

In addition, by the inclusion of the non-halogenous insulated wire, the wiring harness according to the present invention sufficiently delivers heat resistance over a long period of time since the covering material of the non-halogenous insulated wire does not remarkably deteriorate even in the case of being used in contact with a vinyl chloride insulated wire in a wire bundle, a halogenous wiring-harness protective material, a watertight rubber stopper, or a grommet (including the case of being used in proximity thereto).

Therefore, use of the non-halogenous insulated wire and the wiring harness according to the present invention in an automobile can ensure high reliability over a long period of time. In addition, since the non-halogenous insulated wire and the wiring harness according to the present invention possess excellent coordination with the other materials, flexibility in designing and routing the non-halogenous insulated wire and the wiring harness is improved.

BEST MODE FOR CARRYING OUT THE INVENTION

A detailed description of one preferred embodiment of the present invention will now be provided. Incidentally, in the description, a non-halogenous insulated wire according to the preferred embodiment of the present invention is sometimes referred to as "present wire", and a wiring harness according to the preferred embodiment of the present invention is sometimes referred to as "present wiring harness".

1. Non-Halogenous Insulated Wire

The present wire according to the preferred embodiment of the present invention has a multilayered structure such that a conductor is covered with an inside coat and the inside coat is covered with an outermost coat.

1.1 Conductor

For the conductor, a single metallic wire, a strand of a number of individual metallic wires, and a strand of a number of individual metallic wires on which compression is further applied may be used. In addition, the diameter and the material of the conductor are not limited in particular and may be chosen appropriately as usage.

1.2 Outermost Coat

In the present wire, the outermost coat is in the range of 10 to 100 μm in thickness, preferably in the range of 15 to 60 μm, and more preferably in the range of 20 to 50 μm.

If the outermost coat becomes less than 10 μm in thickness, a tendency to hardly obtain sufficient wear resistance is shown. On the other hand, if the outermost coat becomes more than 100 μm in thickness, a tendency to hardly obtain sufficient flame retardancy is shown. Accordingly, the thickness of the outermost coat is preferably determined considering these points.

The outermost coat is made from a resin composition for outermost coat which includes one or more sorts of polyethylene such that an average density of the included polyethylene becomes 0.910 g/cm$^3$ or more.

For the polyethylene included in the resin composition for outermost coat, high-density polyethylene (HDPE), medium-density polyethylene (MDPE), low-density polyethylene (LDPE), linear low-density polyethylene (LLDPE) and very low-density polyethylene (VLDPE) are named.

Polyethylene may be used by one sort alone or more than one sort in combination if the average density thereof is 0.910 g/cm$^3$ or more as a whole. In other words, when two or more sorts of polyethylene are blended, polyethylene having a density less than 0.910 g/cm$^3$ may be included if the average density of two or more sorts of polyethylene is 0.910 g/cm$^3$ or more with respect to the blending ratio thereof.

In addition, the resin composition for outermost coat may include one or more than one sort of resins such as an ethylene-vinyl acetate copolymer and an ethylene-acrylate copolymer to the extent of not being detrimental to flame retardancy, mechanical properties such as wear resistance, flexibility, workability, and coordination with a halogen-containing resin material.

In addition, the resin composition for outermost coat may include a variety of additives such as a cross-linking agent, a cross-linking auxiliary agent, an antioxidant, an ultraviolet rays protective agent, a lubricant and a zinc compound by one or more than one sort.

1.3 Inside Coat

In the present wire, the inside coat may be formed of one layer only, or may be formed of two or more layers. When the inside coat is formed of two or more layers, the materials and the thicknesses of the two or more layers may be entirely the same, or may be different from each other.

Incidentally, at least one of the layers of the inside coat needs to be made from a specific resin composition for inside coat. The position of the layers of the inside coat made from the specific resin composition for inside coat is not limited.

The resin composition for inside coat includes: a resin ingredient by 100 part weight which includes (A) polyethylene having a melt flow rate (MFR) of 5 g/10 min or less and having a density of 0.90 g/cm$^3$ or more, and (B) at least one sort of polymer selected from (B1) an alpha-olefin polymer (copolymer), (B2) an ethylene-vinylester copolymer, (B3) an ethylene-alpha, beta-unsaturated carboxylic acid alkyl ester copolymer, and (B4) a styrene thermoplastic elastomer; (C) a metallic hydrate by 30 to 250 part weight; and (D) a zinc compound by 1 to 20 part weight, in which a weight percentage of (A) the polyethylene is 30 to 90 wt % and a weight percentage of (B) the polymer is 70 to 10 wt %, and at least one of (B) the polymer is modified by acid and/or (E) an organic functional coupling agent is further included by 0.3 to 10 part weight. Hereinafter, descriptions of the respective ingredients of the resin composition for inside coat are provided.

In the resin composition for inside coat, the (A) ingredient is polyethylene having the melt flow rate (MFR) of 5 g/10 min or less and the density of 0.90 g/cm$^3$ or more. For the polyethylene, high-density polyethylene (HDPE), medium-density polyethylene (MDPE), low-density polyethylene (LDPE) and linear low-density polyethylene (LLDPE) which have a melt flow rate (MFR) of 5 g/10 min or less and a density of 0.90 g/cm$^3$ or more are named. They may be used by one sort alone, or more than one sort in combination. Among them, high-density polyethylene. (HDPE) and linear low-density polyethylene (LLDPE) are preferable.

It is desirable that the melt flow rate (MFR) is 5 g/10 min or less, preferably 3 g/10 min or less, and more preferably 2 g/10 min or less. This is because if the melt flow rate (MFR) is over 5 g/10 min, a tendency not to satisfy coordination is shown. Besides, the melt flow rate (MFR) is a value which is measured in accordance with JIS K 6760 or a standard equivalent to JIS K 6760.

In the resin composition for inside coat, the (B) ingredient is at least one sort of polymer selected from (B1) the alpha-olefin polymer (copolymer), (B2) the ethylene-vinylester copolymer, (B3) the ethylene-alpha, beta-unsaturated carboxylic acid alkyl ester copolymer and (B4) the styrene thermoplastic elastomer.

For (B1) the alpha-olefin polymer (copolymer), a homopolymer and a copolymer of alpha-olefin such as ethylene, propylene, 1-butene, 4-methyl-1-pentene, 1-hexene, 1-heptene, 1-octene, 1-nonene, 1-decene, 1-undecene, 1-dodecene, 1-tridecene, 1-tetradecene, 1-pentadecene, 1-hexadecene, 1-heptadecene, 1-nonadecene, 1-eicosene, 9-methyl-1-decene, 11-methyl-1-dodecene and 12-ethyl-1-tetradecene, a copolymer of ethylene and alpha-olefin as above, and a mixture thereof are named.

When a homopolymer of ethylene, i.e., polyethylene is used, it is not particularly specified by the melt flow rate (MFR) and density while the polyethylene of the (A) ingredient is specified thereby, and high-density polyethylene (HDPE), medium-density polyethylene (MDPE), low-density polyethylene (LDPE), linear low-density polyethylene (LLDPE) and very low-density polyethylene (VLDPE) which have an arbitrary melt flow rate (MFR) and density can be used.

In particular, high-density polyethylene (HDPE), linear low-density polyethylene (LLDPE), very low-density polyethylene (VLDPE) and an ethylene-propylene copolymer (EPM) are preferable.

For a vinylester monomer used for (B2) the ethylene-vinylester copolymer, vinyl acetate, vinyl propionate, vinyl caproate, vinyl caprylate, vinyl laurate, vinyl stearate and vinyl trifluoroacetate are named. They may be used by one sort alone, or more than one sort in combination. Above all, an ethylene-vinyl acetate copolymer (EVA) is preferable.

For an alpha, beta-unsaturated carboxylic acid alkyl ester monomer used for (B3) the ethylene-alpha, beta-unsaturated carboxylic acid alkyl ester copolymer, methyl acrylate, ethyl acrylate, butyl acrylate, methyl methacrylate and ethyl methacrylate are named. They may be used by one sort alone, or more than one sort in combination. Above all, an ethylene-ethyl acrylate copolymer (EEA) and an ethylene-butyl acrylate copolymer (EBA) are preferable.

For (B4) the styrene thermoplastic elastomer, a block copolymer of styrene and butadiene (alternatively, styrene and ethylene-propylene), and a hydrogenated or partially-hydrogenated derivative thereof are named. Examples of (B4) the styrene thermoplastic elastomer include a styrene-ethylene-butylene-styrene block copolymer (SEBS) and a styrene-ethylene-propylene-styrene block copolymer (SEPS). They may be used by one sort alone, or more than one sort in combination. In particular, the styrene-ethylene-butylene-styrene block copolymer (SEBS) and the styrene-ethylene-propylene-styrene block copolymer (SEPS) are preferable.

In the case of modifying at least one of (B) the polymer by acid, an unsaturated carboxylic acid, or a derivative thereof can be used for the acid. Examples of the unsaturated carboxylic acid include a maleic acid and a fumaric acid. Examples of the derivative of the unsaturated carboxylic acid include a maleic acid anhydride, a maleic acid monoester and a maleic acid diester. They may be used by one sort alone, or more than one sort in combination. In particular, the maleic acid and the maleic acid anhydride are preferable.

The acid is introduced into (B) the polymer by means of a graft method or a direct (copolymerization) method. In addition, a desirable weight percentage of (B) the polymer to be modified by the acid is 0.1 to 20 wt % of the total, preferably 0.2 to 10 wt %, and more preferably 0.2 to 5 wt %. This is because if the weight percentage of (B) the polymer to be modified by the acid is less than 0.1 wt %, a tendency to degrade wear resistance is shown, and if the weight percentage of (B) the polymer to be modified by the acid is more than 20 wt %, a tendency to deteriorate forming workability is shown.

For (C) the metallic hydrate which is used as a flame retardant, compounds having a hydroxyl group or crystalline water, such as magnesium hydroxide, aluminum hydroxide, zirconium hydroxide, hydrated magnesium silicate, hydrated aluminum silicate, basic magnesium carbonate and hydrotalcite are named. They may be used by one sort alone, or more than one sort in combination. In particular, magnesium hydroxide and aluminum hydroxide are preferable because they are effective in flame retardancy and heat resistance, and advantageous from an economical standpoint.

The particle size of the metallic hydrate differs depending on the sort. When using the above-described magnesium hydroxide or aluminum hydroxide, it is desirable for them to have an average particle size ($d_{50}$) in the range of 0.1 to 20 μm, preferably in the range of 0.2 to 10 μm, and more preferably in the range of 0.3 to 5 μm. This is because if the average particle size is smaller than 0.1 μm, secondary cohesion between particles occurs to demonstrate a tendency to degrade mechanical properties, and if the average particle size is larger than 20 μm, there are tendencies to degrade the mechanical properties and to give rise to surface roughness in a covering material of an insulated wire.

In addition, the surface of the particle may be subjected to surface finishing using a finishing agent such as a coupling agent (e.g., silane system including aminosilane, vinylsilane, epoxysilane and acrylsilane, and titanate system) and a fatty acid (e.g., a stearic acid and an oleic acid). Instead of subjecting the surface to the surface finishing, the finishing agent may be added to the resin composition by an integral blend method (i.e., the finishing agent may be added to the resin composition as a compounding agent simultaneously at the time of mixing the resins), which is not limited in particular. Besides, the coupling agent may be used by one sort alone, or more than one sort in combination.

For (D) the zinc compound, zinc sulfide, zinc sulfate, zinc nitrate and zinc carbonate are named. They may be used by one sort alone, or more than one sort in combination. In particular, zinc sulfide is preferable. This is because it has a beneficial effect on coordination.

Incidentally, coordination is exerted mainly by using the polyethylene of the (A) ingredient which is specified by the specific melt flow rate (MFR) and density, and the zinc compound of the (D) ingredient. For example, if the polyethylene of the (A) ingredient is replaced with polypropylene which is polyolefin too, any coordination cannot be obtained, or inadequate coordination can only be obtained.

Examples of (E) the organic functional coupling agent include coupling agents of vinylsilane, acrylsilane, epoxysilane and aminosilane systems. They may be used by one sort alone, or more than one sort in combination. In particular, vinylsilane and acrylsilane are preferable.

In the resin composition for inside coat, the respective weight percentages of the (A) and (B) ingredients included in 100 part weight of the resin ingredient are in the ranges as follows: the (A) ingredient is in the range of 30 to 90 wt % and the (B) ingredient is in the range of 70 to 10 wt %, preferably the (A) ingredient is in the range of 40 to 90 wt % and the (B) ingredient is in the range of 60 to 10 wt %, and more preferably the (A) ingredient is in the range of 50 to 80 wt % and the (B) ingredient is in the range of 50 to 20 wt %.

This is because if the weight percentage of the (A) ingredient is less than 30 wt % and the weight percentage of the (B) ingredient is more than 70 wt %, a tendency to degrade wear resistance is shown, and if the weight percentage of the (A) ingredient is more than 90 wt % and the weight percentage of the (B) ingredient is less than 10 wt %, tendencies to degrade flexibility and workability are shown.

In the resin composition for inside coat, (C) the metallic hydrate is included by 30 to 250 part weight with respect to 100 part weight of the resin ingredient including the (A) and (B) ingredients, preferably 50 to 200 part weight, and more preferably 60 to 180 part weight.

This is because if (C) the metallic hydrate is included by less than 30 part weight, a tendency to degrade flame retardancy is shown, and if (C) the metallic hydrate is included by more than 250 part weight, tendencies to degrade flexibility and workability are shown.

In the resin composition for inside coat, when (E) the organic functional coupling agent is further included, (E) the organic functional coupling agent is included by 0.3 to 10 part weight with respect to 100 part weight of the resin ingredient including the (A) and (B) ingredients, preferably 0.4 to 8 part weight, and more preferably 0.5 to 4 part weight.

This is because if (E) the organic functional coupling agent is included by less than 0.3 part weight, wear resistance is not improved, and if (E) the organic functional coupling agent is included by more than 10 part weight, there are tendencies to cause bleeding of the organic functional coupling agent and to degrade workability.

In the above description, the ingredients of the resin composition for inside coat are explained. Meanwhile, to the resin composition for inside coat, one or more of general additives as follows may be added: a thermal stabilizer (e.g., an antioxidant and an antiaging agent), a metal deactivator (e.g., a copper inhibitor), a lubricant (e.g., fatty acid base, fatty acid amide base, metal soap base, hydrocarbon system (wax type), ester system and silicon system), a light stabilizer, a nucleating agent, an antistatic agent, a coloring agent, a flame-retardant auxiliary agent (e.g., silicon system, nitrogen system and zinc borate), a coupling agent (e.g., silane system and titanate system), a softener (e.g., a processed oil), a cross-linking agent, and a cross-linking auxiliary agent (e.g., a multifunctional monomer).

Incidentally, the resin composition for inside coat does not include a cross-linking auxiliary agent as an essential ingredient. This is because the resin composition for inside coat can be cross-linked without the cross-linking auxiliary agent included. However, from the view point of improving in cross-linking performance, it is desirable that the cross-linking auxiliary agent is included.

In addition, when the inside coat is formed of two or more layers, the layer(s) other than the layer(s) made from the resin composition for inside coat can be made from such a non-halogenous flame-retardant resin composition that has physical properties to the extent of not being detrimental to physical properties necessary for the present wire.

The description of a basic configuration of the present wire is provided above. Incidentally, the conductor diameter and the thickness of the entire covering material of the present wire are not limited in particular. It is usually arranged that the outside diameter of the wire is 5 mm or less, preferably 4 mm or less, and the thickness of the covering material including the inside coat and the outermost coat is 0.8 mm or less, preferably 0.7 mm or less so as to be used preferably as a thin-walled wire with a small diameter.

In addition, from the viewpoint of further improving heat resistance, the outermost coat and the inside coat may be cross-linked by the use of, for example, radiation, a peroxide and a silane cross-linking agent.

In addition, in the present wire, the inside coat may be directly covered with the outermost coat, or an intermediate material, for example, a shielded conductor such as a braid and a metallic foil may be interposed between the inside coat and the outermost coat so as to be covered with the outermost coat.

2. Production Process of the Present Wire

A production process of the present wire is not limited in particular, and a publicly known production process can be used. For example, firstly, the resin composition for outermost coat and the resin composition for inside coat are prepared by blending the respective ingredients, and the other ingredients and additives as appropriate, and dry-blending them with the use of a regular tumbler, or melting and kneading them so as to be dispersed uniformly with the use of a regular kneader such as a Banbury mixer, a pressure kneader, a kneading extruder, a twin-screw extruder and a roll.

Next, for example, the conductor is covered with the resin composition for inside coat in a given thickness with the use of an extrusion molding machine, and the thus-obtained inside coat is covered with the resin composition for outermost coat in the specified thickness, whereby the present wire can be produced. Additionally, arbitrary application of radiation to the produced present wire allows formation of cross-links in the covering material.

3. Wiring Harness

The present wiring harness is prepared by covering a single wire bundle including only the present wires, or a mixed wire bundle including at least the present wires and vinyl chloride insulated wires, with a wiring-harness protective material.

In the vinyl chloride insulated wires, a vinyl chloride resin composition is used for its covering material. A vinyl chloride resin refers to a resin having vinyl chloride monomers as the main ingredient, and this resin may be homopolymers of vinyl chloride, or copolymers of the vinyl chloride monomers and other monomers. Examples of the vinyl chloride resin include polyvinyl chloride, an ethylene-vinyl chloride copolymer and a propylene-vinyl chloride copolymer.

Incidentally, descriptions about the configuration of the vinyl chloride insulated wire other than the covering material, and a production process of the wire are omitted since they are almost the same as those of the above-described present wire.

The above-described single wire bundle is a wire bundle such that only the present wires are tied into a bundle. Meanwhile, the above-described mixed wire bundle is a wire bundle such that at least the present wires and the vinyl chloride insulated wires are tied into a bundle. The number of the wires included in the single wire bundle and the number of the wires included in the mixed wire bundle can be determined arbitrarily, which are not limited in particular.

In addition, the above-described wiring-harness protective material fills the role of covering the wire bundle including the tied insulated wires and protecting the wire bundle from an external environment.

For a base material from which the wiring-harness protective material is made, a non-halogenous resin composition, a vinyl chloride resin composition, and a halogenous resin composition other than the vinyl chloride resin composition are preferably used.

For the non-halogenous resin composition, polyolefin flame-retardant resin compositions which are prepared by adding various additives such as a non-halogenous flame retardant to polyolefins such as polyethylene, polypropylene and a propylene-ethylene copolymer are named.

For the vinyl chloride resin composition, the vinyl chloride resin composition which is explained above as the material for the vinyl chloride insulated wire is named.

For the halogenous resin composition other than the vinyl chloride resin composition, polyolefin flame-retardant resin compositions which are prepared by adding various additives such as a halogenous flame retardant to the above-described polyolefins are named.

These resin compositions used for the base materials may be cross-linked by a cross-linking agent such as a silane cross-linking agent, or electron radiation as appropriate.

The wiring-harness protective material is formed so as to have its base material tape-shaped and at least one side of the base material applied with an adhesive, or so as to have its base material tube-shaped or sheet-shaped. The shapes can be selected appropriately as usage.

Incidentally, the present wiring harness includes the following wiring harnesses made of the variety of the above-described wire bundles and the variety of the above-described wiring-harness protective materials in varying combinations.

Specifically, the present wiring harness includes a wiring harness which is made by covering the single wire bundle including only the present wires with the vinyl-chloride wiring-harness protective material, a wiring harness which is made by covering the single wire bundle including only the present wires with the non-halogenous wiring-harness protective material, a wiring harness which is made by covering the single wire bundle including only the present wires with the halogenous wiring-harness protective material, a wiring harness which is made by covering the mixed wire bundle including at least the present wires and the vinyl chloride insulated wires with the vinyl-chloride wiring-harness protective material, a wiring harness which is made by covering the mixed wire bundle including at least the present wires and the vinyl chloride insulated wires with the non-halogenous wiring-harness protective material, and a wiring harness which is made by covering the mixed wire bundle including at least the present wires and the vinyl chloride insulated wires with the halogenous wiring-harness protective material.

EXAMPLE

A description of the present invention will now be provided specifically with reference to Examples, however, the present invention is not limited hereto.

Test Material, Manufacturer, and Other Factors

Test materials used in the present Examples are given along with manufacturers, trade names, values of physical properties, and other factors.

Outermost Coat

Polyethylene #1 (PE #1) [manuf.: Japan Polyethylene Corporation, trade name: "NOVATEC HD HY530", density $\rho$: 0.959 g/cm$^3$]

Polyethylene #2 (PE #2) [manuf.: Japan Polyethylene Corporation, trade name: "NOVATEC LL UF840", density $\rho$: 0.930 g/cm$^3$]

Polyethylene #3 (PE #3) [manuf.: Japan Polyethylene Corporation, trade name: "NOVATEC LD ZF33", density $\rho$: 0.920 g/cm$^3$]

Polyethylene #4 (PE #4) [manuf.: Dupont Dow Elastomers Japan, trade name: "ENGAGE8003", density $\rho$: 0.885 g/cm$^3$]

Cross-linking auxiliary agent [manuf.: Shin-nakamura Chemical Corporation, trade name: "TMPTMA"]

Phenolic antioxidant [Manuf.: Ciba Specialty Chemicals Inc., trade name: "Irganox 1010"]

Inside Coat (A) Ingredient

High-density polyethylene #1 (HDPE #1) [manuf.: Japan Polyethylene Corporation, trade name: "NOVATECH DH Y331", MFR: 1.0 g/10 min (JIS K 6760), density $\rho$: 0.950 g/cm$^3$]

Linear low-density polyethylene (LLDPE) [manuf.: Nippon Unicar Company Limited, trade name: "DFDJ 7540", MFR: 0.8 g/10 min (JIS K 6760), density $\rho$: 0.930 g/cm$^3$]

(B) Ingredient (B1) Ingredient

High-density polyethylene #2 (HDPE #2) [manuf.: Japan Polyethylene Corporation, trade name: "NOVATEC HD HJ381", MFR: 11 g/10 min (JIS K 6760), density $\rho$: 0.950 g/cm$^3$]

Very low-density polyethylene (VLDPE) [manuf.: Dupont Dow Elastomers Japan, trade name: "ENGAGE8003", MFR: 1.0 g/10 min (ASTM D-1238), density $\rho$: 0.890 g/cm$^3$]

Modified high-density polyethylene (modified HDPE) [manuf.: Mitsui Chemicals, Inc., trade name: "ADMER HE040"]

Modified linear low-density polyethylene (modified LLDPE) [manuf.: Mitsui Chemicals, Inc., trade name: "ADMER NF558"]

Modified very low-density polyethylene (modified VLDPE) [manuf.: Mitsui Chemicals, Inc., trade name: "ADMER XE070"]

Ethylene-propylene copolymer (EPM) [manuf.: JSR Corporation, trade name: "EP961SP"]

Modified ethylene-propylene copolymer (modified EPM) [manuf.: JSR Corporation, trade name: "T7741P"]

(B2) Ingredient

Ethylene-vinyl acetate copolymer (EVA) [manuf.: Du Pont-Mitsui Polychemicals Co., Ltd., trade name: "EVAFLEX EV360"]

Modified ethylene-vinyl acetate copolymer (modified EVA) [manuf.: Du Pont-Mitsui Polychemicals Co., Ltd., trade name: "HPR VR103"]

(B3) Ingredient

Ethylene-ethyl acrylate copolymer (EEA) [manuf.: Du Pont-Mitsui Polychemicals Co., Ltd., trade name: "EVAFLEX-EEA A-714"]

(B4) Ingredient

Styrene-ethylene-butylene-styrene block copolymer (SEBS) [manuf.: Asahi Kasei Chemicals Corporation, trade name: "Tuftec H1041"]

Styrene-ethylene-propylene-styrene block copolymer (SEPS) [manuf.: KURARAY CO., LTD., trade name: "SEPTON2004"]

Modified styrene-ethylene-butylene-styrene block copolymer (modified SEBS) [manuf.: Asahi Kasei Chemicals Corporation, trade name: "Tuftec M1913"]

(C) Ingredient

Magnesium hydroxide [manuf.: Martinswerk GmbH, trade name: "MAGNIFIN H10", average particle size: about 1.0 μm]

(D) Ingredient

Zinc sulfide #1 [manuf.: Wako Pure Chemical Industries, LTD., reagent]

Zinc sulfide #2 [manuf.: Sachtleben chemie GmbH, trade name: "Sachtolith HD"]

(E) Ingredient

Acrylsilane coupling agent [manuf.: GE Toshiba Silicones, trade name: "TSL8370"]

Vinylsilane coupling agent [manuf.: Shin-Etsu Chemical Co., LTD., trade name: "KBM1003"]

Other Ingredients

Phenolic antioxidant [Manuf.: Ciba Specialty Chemicals Inc., trade name: "Irganox 1010"]

Sulfureous antioxidant [Manuf.: SHIPRO KASEI KAISHA, LTD., trade name: "Seenox 412S"]

Phosphorous antioxidant [Manuf.: Ciba Specialty Chemicals Inc., trade name: "Irgafos 168"]

Metal deactivator [Manuf.: ADEKA CORPORATION, trade name: "CDA-1"]

Cross-linking auxiliary agent [manuf.: Shin-nakamura Chemical Corporation, trade name: "TMPTMA"]

Comparative Ingredients

High-density polyethylene #2 (HDPE #2) [manuf.: Japan Polyethylene Corporation, trade name: "NOVATEC HD HJ381", MFR: 11 g/10 min (JIS K 6760), density ρ: 0.950 g/cm$^3$]

Polypropylene (PP) [manuf.: Japan Polypropylene Corporation, trade name: "NOVATEC EC9", MFR: 0.5 g/10 min (JIS K 6758), density ρ: 0.90 g/cm$^3$]

Zinc oxide [manuf.: Hakusui Tech Co., Ltd., trade name: "Zinc Oxide JIS2"]

Zinc acrylate [Manuf.: Kawaguchi Chemical Industry CO., LTD., trade name: "Actor ZA"]

Zinc borate [manuf.: BORAX, trade name: "Firebrake ZB"]

In the comparative ingredients, the high-density polyethylene #2 (HDPE #2) is regarded as a comparative ingredient in terms of the (A) ingredient while it is regarded as the (B1) ingredient in terms of the (B) ingredient.

Preparation of resin composition for outermost coat, resin composition for inside coat, and insulated wire Firstly, the respective ingredients shown in the below-described tables were kneaded with the use of a double-shaft extruder, and compounds (pellets) of the resin compositions for outermost coat and the resin compositions for inside coat to be used for insulated wires according to the present Examples and the Comparative Examples were prepared.

Next, the obtained pellets of the resin compositions for inside coat and the resin compositions for outermost coat were dried. Then, conductors with a cross sectional area of 0.50 fmm$^2$ (19/0.19) were covered with the resin compositions for inside coat of one layer with the use of an extrusion molding machine so as to form inside coats, and further, the thus-obtained inside coats were covered with the resin compositions for outermost coat so as to form outermost coats. The thicknesses of the entire covering materials including the inside coats and the outermost coats were arranged to be 0.28 mm. The thicknesses of the outermost coats were arranged as shown in the below-described tables. The outside diameters of the wires were arranged to be 1.53 mm.

Then, the thus-obtained insulated wires were irradiated with electron rays so as to prepare the non-halogenous insulated wires according to the present Examples and the non-halogenous insulated wires according to the Comparative Examples. The irradiance level of the electron rays was set at 80 kGy.

Test Procedure

The non-halogenous insulated wires according to the present Examples and the non-halogenous insulated wires according to the Comparative Examples prepared as above were subjected to a flame-retardancy test, a wear-resistance test #1, a wear-resistance test #2, a flexibility test, a workability test, and a coordination test. Hereinafter, descriptions of test procedures and assessment procedures are provided.

Flame-Retardancy Test

The flame-retardancy test was performed based on JASO D611. To be specific, the non-halogenous insulated wires according to the present Examples and the non-halogenous insulated wires according to the Comparative Examples were cut into test specimens 300 mm long, each of which was placed and held horizontal in an iron test box, and a center portion of the test specimen was subjected to the tip of a reducing flame from beneath within 30 seconds until it burned by using a Bunsen burner having a caliber of 10 mm, and then, after the flame was calmly removed, an afterflame time of the test specimen was measured. The test specimen whose afterflame time was within 15 seconds was regarded as passed, and the test specimen whose afterflame time was over 15 seconds was regarded as failed.

Wear-Resistance Test #1

The wear-resistance test #1 was performed by a blade-reciprocating method based on JASO D611. To be specific, the non-halogenous insulated wires according to the present Examples and the non-halogenous insulated wires according to the Comparative Examples were cut into test specimens 750 mm long, and then at a room temperature of 25° C., a blade was made to reciprocate in a direction of its shaft over a length of 10 mm on a surface of the covering material of each of the test specimens which was fixed to a table, and the number of reciprocation before the blade touches the conductor due to the wearing out of the insulated covering material was counted. A load imposed on the blade was set at 7N, and the blade was made to reciprocate at a speed of 50 times/minute. Then, the test specimen was moved by 100 mm and rotated 90 degrees clockwise, and the measurement as described above was repeated. The measurement was performed three times in total with respect to one test specimen, and the test specimen whose smallest reciprocation number was 300 or more was regarded as passed, and the test specimen whose smallest reciprocation number was below 300 was regarded as failed.

Wear-Resistance Test #2

The non-halogenous insulated wires according to the present Examples and the non-halogenous insulated wires according to the Comparative Examples were inserted into corrugated tubes, and were subjected to vibrations under conditions of a frequency of 30 Hz, an acceleration of 44.0 m/s$^2$, a temperature of 100° C., and a time of 240 hours. The insulated wire of which the covering material wore out but its conductor was not exposed was regarded as passed, and the insulated wire of which the covering material wore out so that its conductor was exposed was regarded as failed.

Flexibility Test

The non-halogenous insulated wires according to the present Examples and the non-halogenous insulated wires according to the Comparative Examples were assessed by touch when bending the respective insulated wires by hands. The insulated wire which had a good feel was regarded as passed, and the insulated wire which had a bad feel was regarded as failed.

Workability Test

The workability test was performed by checking whether fringes were formed or not when the covering materials at the ends of the non-halogenous insulated wires according to the present Examples and the non-halogenous insulated wires according to the Comparative Examples were stripped off. The insulated wire which did not form a fringe was regarded as passed and the insulated wire which formed a fringe was regarded as failed.

Coordination Test

The coordination test was performed using the following requirements A and B. The insulated wire which met both the requirements was regarded as passed.

<Requirement A>

By randomly tying ten polyvinyl chloride (PVC) wires made by extrusion-covering conductors with PVC as a covering material and the three non-halogenous insulated wires according to the present Examples, and by randomly tying ten polyvinyl chloride (PVC) wires made by extrusion-covering conductors with PVC as a covering material and the three non-halogenous insulated wires according to the Comparative Examples, mixed wire bundles were prepared. Then, the mixed wire bundles were covered with PVC sheets as a wiring-harness protective material, and the edges of the PVC sheets were wrapped fivefold with PVC tapes as a wiring-harness protective material so as to prepare wiring harnesses. Then, the wiring harnesses were subjected to aging under conditions of 130° C. for 480 hours, and the non-halogenous insulated wires according to the present Examples and the non-halogenous insulated wires according to the Comparative Examples were taken out therefrom. The non-halogenous insulated wires in which no fracture occurred in the covering materials of all the three non-halogenous insulated wires after being wrapped around the object having an outside diameter as large as the outside diameter of the insulated wires were regarded as passed, and the non-halogenous insulated wires in which fracture occurred in the covering material of at least one of the three non-halogenous insulated wires after being wrapped around the object having an outside diameter as large as the outside diameter of the insulated wires were regarded as failed.

<Requirement B>

By randomly tying the three PVC wires and the ten non-halogenous insulated wires according to the present Examples, and by randomly tying the three PVC wires and the ten non-halogenous insulated wires according to the Comparative Examples, mixed wire bundles were prepared. Then, the mixed wire bundles were covered with PVC sheets as a wiring-harness protective material, and the edges of the PVC sheets were wrapped fivefold with PVC tapes as a wiring-harness protective material so as to prepare wiring harnesses. Then, the wiring harnesses were subjected to aging under conditions of 130° C. for 480 hours, and the non-halogenous insulated wires according to the present Examples and the non-halogenous insulated wires according to the Comparative Examples were taken out therefrom. The non-halogenous insulated wires in which no fracture occurred in the covering materials of all the ten non-halogenous insulated wires after being wrapped around the object having an outside diameter as large as the outside diameter of the insulated wires were regarded as passed, and the non-halogenous insulated wires in which fracture occurred in the covering material of at least one of the ten non-halogenous insulated wires after being wrapped around the object having an outside diameter as large as the outside diameter of the insulated wires were regarded as failed.

Blending ratios of the ingredients and assessment results of the resin compositions for outermost coat and the resin compositions for inside coat of the non-halogenous insulated wires according to the present Examples and the non-halogenous insulated wires according to the Comparative Examples are shown in the following Tables 1 to 4.

TABLE 1

| | | | Example | | | | | | | | | |
|---|---|---|---|---|---|---|---|---|---|---|---|---|
| | | | 1 | 2 | 3 | 4 | 5 | 6 | 7 | 8 | 9 | 10 |
| Outermost coat thickness (μm, average value) | | | 30 | 10 | 60 | 100 | 50 | 40 | 30 | 30 | 40 | 30 |
| Outermost coat | PE #1 ρ = 0.959 | | | 100 | 50 | | 40 | | | 80 | 100 | 100 |
| | PE #2 ρ = 0.930 | | 100 | | | 50 | | 100 | 50 | | | |
| | PE #3 ρ = 0.920 | | | | 50 | 50 | | | 50 | | | |
| | PE #4 ρ = 0.885 | | | | | | 60 | | | 20 | | |
| | Cross-linking auxiliary agent | | 3 | 4 | 4 | 3 | 3 | 4 | 4 | 4 | 4 | 4 |
| | Phenolic antioxidant | | 0.5 | | | | 0.5 | | 0.5 | 0.5 | | 0.5 |
| Inside coat | A | HDPE #1 | 30 | 50 | 30 | 50 | 40 | 50 | 60 | 50 | 70 | 60 |
| | | LLDPE | | | | 20 | 50 | | | | | |
| | B | B1  HDPE #2 | | | | | | | | | | |

TABLE 1-continued

|  |  |  | Example |  |  |  |  |  |  |  |  |  |
|---|---|---|---|---|---|---|---|---|---|---|---|---|
|  |  |  | 1 | 2 | 3 | 4 | 5 | 6 | 7 | 8 | 9 | 10 |
|  |  | VLDPE |  | 20 |  |  |  |  |  |  |  |  |
|  |  | Modified HDPE |  |  |  |  |  |  |  |  |  |  |
|  |  | Modified LLDPE | 30 |  |  |  |  |  |  |  |  |  |
|  |  | Modified VLDPE |  |  |  |  | 10 |  |  |  |  |  |
|  |  | EPM |  |  |  |  |  |  |  |  |  |  |
|  |  | Modified EPM |  |  | 30 |  |  |  |  |  |  | 20 |
|  | B2 | EVA | 40 |  |  |  |  | 50 | 40 | 20 |  |  |
|  |  | Modified EVA |  | 30 |  |  |  |  |  | 30 |  |  |
|  | B3 | EEA |  |  |  | 30 |  |  |  |  |  |  |
|  | B4 | SEBS |  |  | 20 |  |  |  |  |  |  |  |
|  |  | SEPS |  |  |  |  |  |  |  |  |  | 20 |
|  |  | Modified SEBS |  |  |  | 20 |  |  |  |  | 30 |  |
| C |  | Magnesium hydroxide | 30 | 250 | 90 | 100 | 40 | 90 | 120 | 80 | 90 | 150 |
| D |  | Zinc sulfide #1 | 3 |  | 20 | 1 | 3 | 5 | 6 | 5 | 4 | 5 |
|  |  | Zinc sulfide #2 |  | 5 |  |  |  |  |  |  |  |  |
| E |  | Acrylsilane coupling agent |  |  |  |  |  | 0.3 | 10 |  | 2 |  |
|  |  | Vinylsilane coupling agent |  |  |  |  |  |  |  | 3 |  |  |
| Others |  | Phenolic antioxidant | 3 | 4 | 3 | 5 | 4 | 2 | 4 | 3 | 2 | 3 |
|  |  | Sulfureous antioxidant | 1 | 1 | 2 | 2 |  | 1 | 1 | 1 | 0.5 | 1 |
|  |  | Phosphorous antioxidant |  | 0.5 |  | 1 |  | 0.5 |  | 0.5 | 1 |  |
|  |  | Metal deactivator | 1 | 1 |  | 1 | 1 | 1 |  | 1 | 1 | 0.5 |
|  |  | Cross-linking auxiliary agent | 2 | 4 | 2 | 4 | 4 | 3 | 2 | 2 | 4 | 4 |
| Flame retardancy |  |  | passed | passed | passed | passed | passed | passed | passed | passed | passed | passed |
| Wear resistance #1 |  |  | passed | passed | passed | passed | passed | passed | passed | passed | passed | passed |
| Wear resistance #2 |  |  | passed | passed | passed | passed | passed | passed | passed | passed | passed | passed |
| Flexibility |  |  | passed | passed | passed | passed | passed | passed | passed | passed | passed | passed |
| Workability |  |  | passed | passed | passed | passed | passed | passed | passed | passed | passed | passed |
| Coordination: Requirement A |  |  | passed | passed | passed | passed | passed | passed | passed | passed | passed | passed |
| Coordination: Requirement B |  |  | passed | passed | passed | passed | passed | passed | passed | passed | passed | passed |

TABLE 2

|  |  |  | Example |  |  |  |  |  |  |  |  |  |
|---|---|---|---|---|---|---|---|---|---|---|---|---|
|  |  |  | 11 | 12 | 13 | 14 | 15 | 16 | 17 | 18 | 19 | 20 |
| Outermost coat thickness (μm, average value) |  |  | 30 | 30 | 50 | 45 | 50 | 35 | 60 | 30 | 25 | 20 |
| Outermost coat |  | PE #1 ρ = 0.959 | 100 | 100 | 50 |  |  | 100 | 100 | 100 | 100 | 100 |
|  |  | PE #2 ρ = 0.930 |  |  |  | 50 | 100 | 100 |  |  |  |  |
|  |  | PE #3 ρ = 0.920 |  |  |  |  |  |  |  |  |  |  |
|  |  | PE #4 ρ = 0.885 |  |  |  |  |  |  |  |  |  |  |
|  |  | Cross-linking auxiliary agent | 3 | 4 | 4 | 3 | 3 | 4 | 4 | 4 | 4 | 4 |
|  |  | Phenolic antioxidant |  |  |  |  | 0.5 |  | 0.5 | 0.5 | 0.5 | 0.5 |
| Inside coat | A | HDPE #1 | 60 | 50 | 30 |  | 60 | 60 | 60 | 30 | 30 | 90 |
|  |  | LLDPE |  | 20 |  | 70 |  |  |  |  |  |  |
|  | B | B1 | HDPE #2 |  |  |  |  |  |  |  |  | 20 |  |
|  |  |  | VLDPE |  |  |  |  |  |  |  |  |  |  |
|  |  |  | Modified HDPE |  |  | 20 |  |  |  |  | 20 |  |  |
|  |  |  | Modified LLDPE |  |  |  |  |  |  |  |  |  |  |
|  |  |  | Modified VLDPE |  | 30 |  |  |  |  |  |  |  |  |
|  |  |  | EPM | 30 |  |  |  |  |  |  |  |  |  |
|  |  |  | Modified EPM |  |  |  |  |  |  |  |  |  |  |
|  |  | B2 | EVA |  |  |  | 30 |  | 20 |  | 20 | 30 |  |
|  |  |  | Modified EVA |  |  |  |  | 30 |  | 20 | 10 |  |  |
|  |  | B3 | EEA |  |  |  |  |  |  |  |  |  | 30 |
|  |  | B4 | SEBS |  |  |  |  |  |  |  | 20 |  |  |
|  |  |  | SEPS |  |  |  |  |  |  |  |  |  |  |
|  |  |  | Modified SEBS | 10 |  | 20 |  | 20 | 20 | 10 |  | 20 | 10 |
|  | C |  | Magnesium hydroxide | 100 | 70 | 70 | 90 | 100 | 100 | 70 | 100 | 90 | 90 |
|  | D |  | Zinc sulfide #1 |  | 3 | 15 | 4 | 5 | 5 | 5 |  | 5 | 5 |
|  |  |  | Zinc sulfide #2 | 5 |  |  |  |  |  |  | 3 |  |  |
|  | E |  | Acrylsilane coupling agent |  |  |  | 2 |  |  |  |  |  |  |
|  |  |  | Vinylsilane coupling agent |  |  |  |  |  |  |  |  |  |  |
|  | Others |  | Phenolic antioxidant | 4 | 3 | 3 | 3 | 2 | 2 | 2 | 3 | 3 | 4 |
|  |  |  | Sulfureous antioxidant | 1 | 2 | 1 | 1 | 0.5 | 0.5 | 0.5 | 1 | 1 | 1 |
|  |  |  | Phosphorous antioxidant |  | 0.5 |  |  |  |  |  |  |  |  |
|  |  |  | Metal deactivator | 1 | 0.5 | 1 | 1 | 0.5 | 0.5 | 0.5 | 1 | 1 | 1 |
|  |  |  | Cross-linking auxiliary agent | 4 | 2 | 4 | 2 | 2 | 2 | 3 | 4 | 4 | 4 |
| Flame retardancy |  |  | passed | passed | passed | passed | passed | passed | passed | passed | passed | passed |
| Wear resistance #1 |  |  | passed | passed | passed | passed | passed | passed | passed | passed | passed | passed |
| Wear resistance #2 |  |  | passed | passed | passed | passed | passed | passed | passed | passed | passed | passed |

TABLE 2-continued

|  | Example |  |  |  |  |  |  |  |  |  |
|---|---|---|---|---|---|---|---|---|---|---|
|  | 11 | 12 | 13 | 14 | 15 | 16 | 17 | 18 | 19 | 20 |
| Flexibility | passed | passed | passed | passed | passed | passed | passed | passed | passed | passed |
| Workability | passed | passed | passed | passed | passed | passed | passed | passed | passed | passed |
| Coordination: Requirement A | passed | passed | passed | passed | passed | passed | passed | passed | passed | passed |
| Coordination: Requirement B | passed | passed | passed | passed | passed | passed | passed | passed | passed | passed |

TABLE 3

|  |  |  | Comparative Example |  |  |  |  |  |  |  |  |  |  |
|---|---|---|---|---|---|---|---|---|---|---|---|---|---|
|  |  |  | 1 | 2 | 3 | 4 | 5 | 6 | 7 | 8 | 9 | 10 | 11 |
| Outermost coat thickness (μm, average value) |  |  | 5 | 120 | 50 | 60 | 40 | 50 | 20 | 30 | 30 | 30 | 30 |
| Outermost coat | PE #1 ρ = 0.959 |  | 100 |  | 50 | 80 |  |  |  | 100 |  |  |  |
|  | PE #2 ρ = 0.930 |  |  | 80 |  |  |  | 50 | 50 |  | 100 | 100 | 100 |
|  | PE #3 ρ = 0.920 |  |  | 20 | 50 |  |  | 50 | 50 |  |  |  |  |
|  | PE #4 ρ = 0.885 |  |  |  |  | 20 | 100 |  |  |  |  |  |  |
|  | Cross-linking auxiliary agent |  | 3 | 4 | 4 | 3 | 3 | 4 | 4 | 4 | 4 | 4 | 4 |
|  | Phenolic antioxidant |  |  |  |  |  | 0.5 |  | 0.5 | 0.5 | 0.5 |  |  |
| Inside coat | A | HDPE #1 |  | 95 | 50 | 70 | 30 | 40 | 50 | 50 | 60 | 60 | 70 |
|  |  | LLDPE | 20 |  |  |  |  |  |  |  |  |  |  |
|  |  | HDPE #2 (*) |  |  |  |  |  |  |  |  |  |  |  |
|  |  | PP (*) |  |  |  |  |  |  |  |  |  |  |  |
|  | B | B1 HDPE #2 |  |  |  |  |  |  |  |  |  |  |  |
|  |  | VLDPE |  |  |  |  |  |  |  |  |  |  |  |
|  |  | Modified HDPE |  |  |  |  |  |  |  |  |  |  |  |
|  |  | Modified LLDPE |  |  |  |  |  |  |  |  |  |  |  |
|  |  | Modified VLDPE | 30 |  |  |  |  |  | 20 |  |  |  |  |
|  |  | EPM |  |  |  |  |  |  |  |  |  |  |  |
|  |  | Modified EPM |  |  |  |  |  |  |  |  |  |  |  |
|  |  | B2 EVA | 50 |  |  |  | 70 | 60 | 30 | 20 |  | 20 |  |
|  |  | Modified EVA |  |  | 20 |  |  |  |  | 30 |  | 30 | 20 |
|  |  | B3 EEA |  |  | 30 | 10 |  |  |  |  | 20 |  |  |
|  |  | B4 SEBS |  |  |  |  |  |  |  |  |  |  | 10 |
|  |  | SEPS |  |  |  |  |  |  |  |  |  |  |  |
|  |  | Modified SEBS |  | 5 |  | 20 |  |  |  | 20 |  |  |  |
|  | C | Magnesium hydroxide | 50 | 100 | 20 | 270 | 50 | 90 | 120 | 80 | 100 | 100 | 130 |
|  | D | Zinc sulfide #1 | 5 | 5 | 5 | 3 | 3 | 5 | 4 |  |  |  | 0.5 |
|  |  | Zinc sulfide #2 |  |  |  |  |  |  |  |  |  |  |  |
|  |  | Zinc oxide (*) |  |  |  |  |  |  |  |  |  |  |  |
|  |  | Zinc acrylate (*) |  |  |  |  |  |  |  |  |  |  |  |
|  |  | Zinc borate (*) |  |  |  |  |  |  |  |  |  |  |  |
|  | E | Acrylsilane coupling agent |  |  |  |  |  | 0.1 | 15 | 3 |  |  |  |
|  |  | Vinylsilane coupling agent |  |  |  |  |  |  |  |  |  |  |  |
|  | Others | Phenolic antioxidant | 3 | 4 | 3 | 3 | 3 | 2 | 4 | 3 | 8 | 6 | 3 |
|  |  | Sulfureous antioxidant | 1 |  | 2 | 2 | 1 | 1 | 1 | 1 | 2 | 6 | 1 |
|  |  | Phosphorous antioxidant |  |  |  | 0.5 |  |  |  | 0.5 | 1 |  |  |
|  |  | Metal deactivator | 1 | 1 | 0.5 | 1 | 1 | 1 | 0.5 | 1 | 2 | 1 | 0.5 |
|  |  | Cross-linking auxiliary agent | 4 | 4 | 2 | 4 | 4 | 4 | 3 | 2 | 4 | 2 | 4 |
| Flame retardancy |  |  | passed | failed | failed | passed | passed | passed | passed | passed | passed | passed | passed |
| Wear resistance #1 |  |  | failed | passed | passed | passed | failed | failed | passed | passed | passed | passed | passed |
| Wear resistance #2 |  |  | failed | passed | passed | passed | failed | passed | passed | passed | passed | passed | passed |
| Flexibility |  |  | passed | failed | passed | failed | passed | passed | passed | passed | passed | passed | passed |
| Workability |  |  | passed | failed | passed | failed | passed | passed | failed | passed | passed | passed | passed |
| Coordination: Requirement A |  |  | passed | passed | passed | passed | passed | passed | passed | failed | failed | failed | failed |
| Coordination: Requirement B |  |  | passed | passed | passed | passed | passed | passed | passed | failed | failed | failed | failed |

Note:
(*) Comparative Ingredient

TABLE 4

| | | Comparative Example | | | | | | | | | | |
|---|---|---|---|---|---|---|---|---|---|---|---|
| | | 12 | 13 | 14 | 15 | 16 | 17 | 18 | 19 | 20 | 21 | 22 |
| Outermost coat thickness (μm, average value) | | 25 | 40 | 40 | 50 | 30 | 60 | 40 | 40 | 50 | 30 | 30 |
| Outermost coat | PE #1 ρ = 0.959 | 100 | 100 | 80 | 100 | 60 | 100 | | 100 | 100 | 100 | 100 |
| | PE #2 ρ = 0.930 | | | | | 40 | | 100 | | | | |
| | PE #3 ρ = 0.920 | | | 20 | | | | | | | | |
| | PE #4 ρ = 0.885 | | | | | | | | | | | |
| | Cross-linking auxiliary agent | 3 | 3 | 4 | 4 | 4 | 3 | 3 | 3 | 4 | 4 | 4 |
| | Phenolic antioxidant | | 0.5 | | | | 0.5 | | | 0.5 | | |
| Inside coat A | HDPE #1 | 20 | 60 | 50 | 50 | 50 | 50 | | | | | |
| | LLDPE | 40 | | 20 | | | | | | | | |
| | HDPE #2 (*) | | | | | | | | 80 | | | |
| | PP (*) | | | | | | | | | 60 | 60 | 60 | 60 |
| B | B1 HDPE #2 | | | | | | | | | | | |
| | VLDPE | | | | | | | | | | | |
| | Modified HDPE | | | | | | | | | | | |
| | Modified LLDPE | | | | | | | | | | | |
| | Modified VLDPE | 20 | | | | | | | | | | |
| | EPM | | | | | | | | | | | |
| | Modified EPM | | | | | | | | | | | |
| | B2 EVA | 20 | 40 | | 30 | 30 | 30 | | 20 | 20 | 20 | 20 |
| | Modified EVA | | | 30 | 20 | 20 | 20 | | | | | |
| | B3 EEA | | | | | | | | | | | |
| | B4 SEBS | | | | | | | | | | | |
| | SEPS | | | | | | | | | | | |
| | Modified SEBS | | | | | | | 20 | 20 | 20 | 20 | 20 |
| C | Magnesium hydroxide | 100 | 90 | 90 | 90 | 90 | 90 | 70 | 90 | 90 | 90 | 90 |
| D | Zinc sulfide #1 | 25 | | | | | | 5 | | | 5 | 5 |
| | Zinc sulfide #2 | | | | | | | | | | | |
| | Zinc oxide (*) | | | | 5 | | | | | | | |
| | Zinc acrylate (*) | | | | | 5 | | | | | | |
| | Zinc borate (*) | | | | | | 5 | | | | | |
| E | Acrylsilane coupling agent | | 2 | | | | | | | | | |
| | Vinylsilane coupling agent | | | | | | | | | | | |
| Others | Phenolic antioxidant | 4 | 3 | 4 | 3 | 3 | 3 | 3 | 4 | 4 | 4 | 4 |
| | Sulfureous antioxidant | 1 | 1 | 2 | 1 | 1 | 1 | 1 | | | | |
| | Phosphorous antioxidant | | | 0.5 | | | | | | | | |
| | Metal deactivator | 1 | 1 | 1 | 1 | 1 | 1 | 1 | 1 | 1 | 1 | 1 |
| | Cross-linking auxiliary agent | 4 | 2 | 4 | 4 | 4 | 4 | 3 | | 4 | | 4 |
| Flame retardancy | | passed | passed | passed | passed | passed | passed | passed | passed | passed | passed | passed |
| Wear resistance #1 | | failed | passed | passed | passed | passed | passed | passed | passed | passed | passed | passed |
| Wear resistance #2 | | passed | passed | passed | passed | passed | passed | passed | passed | passed | passed | passed |
| Flexibility | | passed | passed | passed | passed | passed | passed | passed | passed | passed | passed | passed |
| Workability | | passed | passed | passed | passed | passed | passed | passed | passed | passed | passed | passed |
| Coordination: Requirement A | | failed | failed | failed | failed | failed | failed | failed | failed | failed | failed | failed |
| Coordination: Requirement B | | failed | failed | failed | failed | failed | failed | passed | failed | failed | failed | failed |

Note:
(*) Comparative Ingredient

According to Tables 3 and 4, it was shown that all of the non-halogenous insulated wires according to the Comparative Examples gave results of "failed" in any of the assessment items of flame-retardancy, wear-resistance #1, wear-resistance #2, flexibility, workability and coordination.

To be specific, the Comparative Example 1, in which the outermost coat has the thickness below the specified range of thicknesses and the (A) and (B) ingredients are not in the specified ranges of weight percentages, does not satisfy wear resistance of #1 and wear resistance #2. An insulated wire including no outermost coat is included in the insulated wire including the outermost coat having the thickness below the specified range of thickness.

The Comparative Example 2, in which the outermost coat has the thickness above the specified range of thicknesses and the (A) and (B) ingredients are not in the specified ranges of weight percentages, does not satisfy flame retardancy, flexibility and workability.

The Comparative Examples 3 and 4, in which the metallic hydrates that define the (C) ingredients are not in the specified ranges of part weights, do not satisfy flame retardancy, or flexibility and workability.

The Comparative Example 5, in which the polymer that defines the (B) ingredient is not modified by acid and none of the organic functional coupling agents that define the (E) ingredient is included, does not satisfy wear resistance #1 and wear resistance #2.

The Comparative Examples 6 and 7, in which the organic functional coupling agents that define the (E) ingredient are included but are not in the specified ranges of part weights, do not satisfy wear resistance #1 or workability.

The Comparative Examples 8 to 14, in which none of the zinc compounds that define the (D) ingredient is included or the zinc compounds are included but are not in the specified ranges of part weights, do not satisfy coordination.

The Comparative Examples 15 to 17, in which none of the zinc compounds that define the (D) ingredient is included, do not satisfy coordination.

The Comparative Example 18, in which none of the polyethylene having the melt flow rate (MFR) of 5 g/10 min or less and having the density of 0.90 g/cm$^3$ or more that defines the (A) ingredient is included, does not satisfy coordination.

The Comparative Examples 19 and 20, in which none of the polyethylene having the melt flow rate (MFR) of 5 g/10 min or less and having the density of 0.90 g/cm$^3$ or more that defines the (A) ingredient is included and polypropylene is included instead as a comparative ingredient, and none of the zinc compounds that define the (D) ingredient is included, do not satisfy coordination.

The Comparative Examples 21 and 22, in which polypropylene is included as a comparative ingredient instead of the (A) ingredient as in the case of the Comparative Examples 19 and 20 while the zinc compounds that define the (D) ingredient are included, do not satisfy coordination.

On the other hand, according to Tables 1 and 2, it was shown that the non-halogenous insulated wires according to the present Examples and the wiring harnesses including the same were superior all in flame retardancy, wear resistance #1, wear resistance #2, flexibility, workability and coordination.

The invention claimed is:

1. A non-halogenous insulated wire comprising:
   a conductor;
   an inside coat formed of one or more layers and arranged to cover the conductor; and
   an outermost coat arranged to cover the inside coat, wherein
   the outermost coat is in the range of 10 to 100 μm in thickness, and is made from a resin composition including one or more sorts of polyethylene such that an average density of the included polyethylene becomes 0.910 g/cm$^3$ or more, and
   at least one of the layers of the inside coat is made from a resin composition including:
   a resin ingredient by 100 part weight which includes:
   (A) polyethylene having a melt flow rate (MFR) of 5 g/10 min or less and having a density of 0.90 g/cm$^3$ or more; and
   (B) at least one sort of polymer selected from (B1) an alpha-olefin polymer (copolymer), (B2) an ethylene-vinylester copolymer, (B3) an ethylene-alpha, beta-unsaturated carboxylic acid alkyl ester copolymer, and (B4) a styrene thermoplastic elastomer;
   (C) a metallic hydrate by 30 to 250 part weight; and
   (D) a zinc compound by 1 to 20 part weight,
   in which a weight percentage of (A) the polyethylene is 30 to 90 wt % and a weight percentage of (B) the polymer is 70 to 10 wt %, and at least one of (B) the polymer is modified by acid and/or (E) an organic functional coupling agent is further included by 0.3 to 10 part weight.

2. The non-halogenous insulated wire according to claim 1, wherein (D) the zinc compound is zinc sulfide.

3. The non-halogenous insulated wire according to claim 2, wherein at least one of the outermost coat and the inside coat is cross-linked.

4. A wiring harness comprising the non-halogenous insulated wire according to claim 3.

5. A wiring harness comprising the non-halogenous insulated wire according to claim 2.

6. The non-halogenous insulated wire according to claim 1, wherein at least one of the outermost coat and the inside coat is cross-linked.

7. A wiring harness comprising the non-halogenous insulated wire according to claim 6.

8. A wiring harness comprising the non-halogenous insulated wire according to claim 1.

* * * * *